(No Model.)
W. MENDHAM.
APPARATUS FOR PREPARING CLAY.
No. 370,553. Patented Sept. 27, 1887.
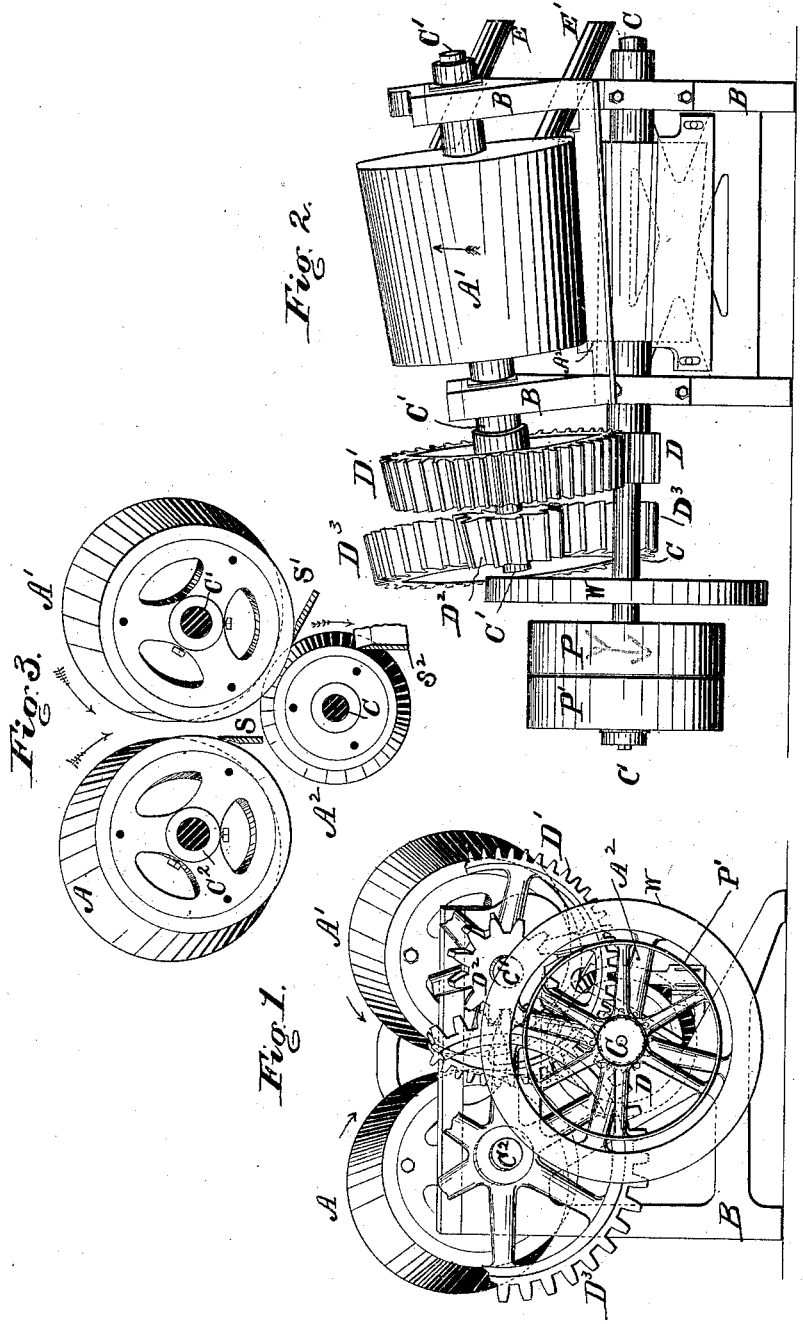
WITNESSES:
John Nolan,
John W. Orr.
INVENTOR
William Mendham,
per Joshua Pusey, atty.

UNITED STATES PATENT OFFICE.

WILLIAM MENDHAM, OF PHILADELPHIA, PENNSYLVANIA, ASSIGNOR TO CYRUS CHAMBERS, JR., OF SAME PLACE.

APPARATUS FOR PREPARING CLAY.

SPECIFICATION forming part of Letters Patent No. 370,553, dated September 27, 1887.

Application filed April 24, 1885. Serial No. 163,260. (No model.)

*To all whom it may concern:*

Be it known that I, WILLIAM MENDHAM, a citizen of the United States, residing at the city and county of Philadelphia, and State of Pennsylvania, have invented certain new and useful Improvements in Apparatus for Preparing Clay, of which the following is a full, clear, and exact description, reference being had to the accompanying drawings, of which—

Figure 1 is an end elevation, part of gears being broken away; Fig. 2, a side elevation; and Fig. 3 is a transverse section of the rolls.

My invention relates to apparatus for preparing clay for brick-machines, wherein the clay is crushed between rollers.

It is an improvement upon the apparatus described in Letters Patent No. 277,459, granted to Cyrus Chambers, Jr., on the 15th day of May, A. D. 1883, to which reference may be had; also more particularly an improvement upon a certain mechanism for a like purpose invented by said Cyrus Chambers, Jr., for which an application for Letters Patent was filed by him on the 14th day of April, A. D. 1885, Serial No. 162,181. The last-mentioned apparatus consists, mainly, of two pairs of tapering-rollers, one pair of which is journaled in a suitable frame-work immediately above the other pair, of smaller diameter, the former being adapted to take in and crush the larger lumps or clods of clay and the latter the smaller ones that escape between the wider bite of the upper pair. The particular form or detailed construction of the rolls in my apparatus is identical with that of said Cyrus Chambers, Jr., above referred to, my improvement consisting in a certain arrangement or combination whereby I am enabled to dispense with one roller of the smaller pair—that is, I accomplish the same object as that of the four-roll or two-pair system shown in Mr. Chambers's said application by a three-roll system, which I shall now proceed to describe, reference being had to the annexed drawings.

A A' are two tapering rollers journaled in juxtaposition in a suitable strong frame, B.

$A^2$ is a small tapering roll, also journaled in said frame, so that its periphery is brought adjacent to and parallel with that of (in the present instance) the roll A'. An adjustable scraper, S, Fig. 3, which also operates as a deflector, serves to clean the clay from roll A and to direct the body of clay falling from between said rolls A A' so that it will be carried into the bite of rolls A' and $A^2$. Rolls A A' are caused to rotate in opposite directions, and roll $A^2$ in the direction opposite to that of A', as indicated by the arrows in Fig. 3. This is accomplished as follows: The power is applied to the tight pulley P, Fig. 2, upon the main driving-shaft C, which also has a fly-wheel, W, and a loose pulley, P'. Shaft C carries roller $A^2$, and also a pinion, D, whose cogs engage with those of a spur-wheel, D', upon the shaft C' of roll A'. This shaft also has at its extremity a pinion, $D^2$, which gears with a spur-wheel, $D^3$, on the shaft $C^2$ of roll A.

It will be obvious that when the driving-wheel P is driven in the direction of the arrow thereon in Fig. 2 the rolls will all be rotated together in the direction of the arrows in Fig. 3.

The clay is fed between the rolls A A', or into a suitable hopper, (not shown,) which delivers the same in between said rolls A A'. The stones and other obstructions are carried in a well-known manner to the highest point of the rolls, where they finally escape by falling into an inclosed spout, E, Fig. 2. The smaller stones that pass through between the two upper rolls are delivered from between rolls A' and $A^2$ by a spout, E', in like manner. The smaller lumps of clay which fall down between rolls A A' are deflected by scraper S upon the periphery of the lower roll, $A^2$, and are crushed between the latter and the roll A', thence passing out into a suitable receptacle, or usually upon an elevator, which conveys it (the clay) to the brick-machine. As seen in Fig. 3, the distance apart of the rolls A A' is greater than that of rolls A' $A^2$.

A scraper, S', is used to clean the face of roll A', and another, $S^2$, is also applied for a like purpose to roll $A^2$.

By means of the gear system the rolls are run at different speeds in order to secure a rubbing and grinding as well as a crushing action.

I am aware of the fact that a trio of rolls, of which two run in opposite directions and the third is arranged underneath one of said upper rolls and in contact therewith, or nearly so, has been used for working and tempering clay in a brick-machine, as shown in Hervier's patent, No. 154,044, of August 11, 1874.

Having thus described my invention, I claim—

In an apparatus for preparing clay, the combination of two large tapering rolls, A A', driven in opposite directions, and a third smaller tapering roll, $A^2$, in juxtaposition with one of said two rolls, said roll $A^2$ being driven in a direction contrary to that of A', whereby the larger lumps of clay are crushed between rolls A and A' and the larger stones are thrown out, and the smaller lumps of clay are crushed between rolls A' and $A^2$ and the smaller stones are thrown out, all constructed and adapted to operate substantially as and for the purpose set forth.

In testimony whereof I have hereunto affixed my signature this 20th day of April, A. D. 1885.

WILLIAM MENDHAM.

Witnesses:
JOHN NOLAN,
FRANCIS S. BROWN.